(12) United States Patent
Oikawa et al.

(10) Patent No.: US 9,494,247 B2
(45) Date of Patent: Nov. 15, 2016

(54) FLUID PRESSURE CONTROL DEVICE

(71) Applicant: KEIHIN CORPORATION, Shinjuku-Ku, Tokyo (JP)

(72) Inventors: Naoki Oikawa, Kakuda (JP); Kentarou Yamanaka, Kakuda (JP)

(73) Assignee: Keihin Corporation, Tokyo (JP)

( * ) Notice: Subject to any disclaimer, the term of this patent is extended or adjusted under 35 U.S.C. 154(b) by 76 days.

(21) Appl. No.: 14/712,001

(22) Filed: May 14, 2015

(65) Prior Publication Data

US 2015/0337980 A1    Nov. 26, 2015

(30) Foreign Application Priority Data

May 21, 2014   (JP) .................................. 2014-105289

(51) Int. Cl.
| | |
|---|---|
| *F16K 31/06* | (2006.01) |
| *F16K 11/06* | (2006.01) |
| *F15B 13/043* | (2006.01) |
| *F16K 31/42* | (2006.01) |
| *F16K 11/07* | (2006.01) |

(52) U.S. Cl.
CPC ........... *F16K 31/061* (2013.01); *F15B 13/043* (2013.01); *F16K 11/06* (2013.01); *F16K 31/426* (2013.01); *F16K 11/07* (2013.01); *Y10T 137/86582* (2015.04); *Y10T 137/86614* (2015.04); *Y10T 137/86879* (2015.04)

(58) Field of Classification Search
CPC ....................... F16K 11/06; F16K 11/07; F16K 31/123; F16K 31/426; F16K 31/061; F16K 31/0613; F15B 13/043; F15B 13/0433; Y10T 137/86574; Y10T 137/86582; Y10T 137/86614; Y10T 137/86879

USPC ................. 137/625.2, 625.6, 625.48, 625.64
See application file for complete search history.

(56) References Cited

U.S. PATENT DOCUMENTS 3,270,776 A * 9/1966 Carls .................... F15B 13/0431
137/270
3,286,734 A * 11/1966 Hartshorne ............. B60T 8/363
137/116.3
(Continued)

FOREIGN PATENT DOCUMENTS

| JP | 2002115770 A | * | 4/2002 |
| JP | 2003-156173 A |   | 5/2003 |
| JP | 3863763 B2 | * | 12/2006 |

*Primary Examiner* — Mary McManmon
*Assistant Examiner* — Richard K Durden
(74) *Attorney, Agent, or Firm* — Carrier Blackman & Associates, P.C.; Joseph P. Carrier; William D. Blackman

(57) ABSTRACT

A solenoid section of a solenoid three-way valve includes a yoke attached to a valve housing and formed from a bottomed cylindrical main yoke and an auxiliary yoke closing an open end of the main yoke, a coil assembly inside the yoke, a fixed core slidably fitted into a hollow portion of a bobbin and abutted against a ceiling wall of the main yoke, a movable core facing the fixed core and passing through the auxiliary yoke, and a coil spring compressed between the cores. The fixed core is abutted against the wall by a predetermined spring load and by electromagnetic attraction force between the core and wall based on coil energization. A valve rod is slidably supported in a housing hole, having one end separably abutted against an outer end of the movable core and an opposite end abutted against a valve body.

4 Claims, 4 Drawing Sheets

(56) References Cited

U.S. PATENT DOCUMENTS

| | | | | |
|---|---|---|---|---|
| 5,836,335 A | * | 11/1998 | Harms | F15B 13/0402 |
| | | | | 137/14 |
| 6,206,343 B1 | * | 3/2001 | Kato | F16K 31/0613 |
| | | | | 251/129.15 |
| 2005/0211938 A1 | * | 9/2005 | Ryuen | F16K 11/0716 |
| | | | | 251/129.15 |

* cited by examiner

FLUID PRESSURE CONTROL DEVICE

BACKGROUND OF THE INVENTION

1. Field of the Invention

The present invention relates to an improvement of a fluid pressure control device which includes: a spool valve for alternatively switching communication and disconnection of an output port with and from an input port or a release port depending on whether fluid pressure is applied to or released from a pilot chamber; and a solenoid three-way valve for alternatively switching between a condition for applying the fluid pressure to the pilot chamber from the input port, and a condition for releasing the fluid pressure from the pilot chamber.

2. Description of the Related Art

Japanese Patent Application Laid-open No. 2003-156173 and the like have already made known the following fluid pressure control device. The spool valve and the solenoid three-way valve are disposed in a valve housing such that axes of the spool valve and the solenoid three-way valve are in parallel with each other. A size of the valve housing, namely the fluid pressure control device, is reduced in a direction along the axes of these valves. In addition, a fluid pressure release passage leading to a valve chamber of the solenoid three-way valve is provided to the valve housing so as to lead to the release port of the spool valve. By these, no specialized release port needs be provided to the solenoid three-way valve side, and pipe connection can be simplified.

The conventional fluid pressure control device, however, involves a problem of an increase in manufacturing cost, because a fixed core and a solenoid housing (yoke) are formed integrally by forging and the like. In addition, because a part of a valve section and a part of a solenoid section, of the solenoid three-way valve, are integrally connected to each other, the structure of the fluid pressure control device is disadvantageous from a viewpoint of cost reduction by commonly using a configuration part of the solenoid section for a different solenoid valve (a solenoid two-way valve, for example) whose valve section has a different structure.

SUMMARY OF THE INVENTION

The present invention has been made with the foregoing situation taken into consideration. An object of the present invention is to provide a low-cost fluid pressure control device with a simple structure, which is capable of solving all the above-mentioned problems with the conventional fluid pressure control device simultaneously.

In order to achieve the object, according to a first aspect of the present invention, there is provided a fluid pressure control device comprising: a valve housing; a spool valve; and a solenoid three-way valve used to switch an operation of the spool valve, the spool valve and the solenoid three-way valve being provided in the valve housing, in which the spool valve includes a spool, the spool having one end facing a pilot chamber, and the spool is biased by a spring in a direction of decreasing a volume of the pilot chamber, the spool is slidably fitted in the valve housing so as to be able to alternatively communicate an output port with one of an input port and a release port, the solenoid three-way valve includes a valve section having a valve body and a valve chamber, the valve body being operated to alternatively switch between a first operating condition and a second operating condition, wherein in the first operating condition the valve chamber leading to the pilot chamber is communicated with the input port, and in the second operating condition the valve chamber is communicated with the release port, and a solenoid section which exerts electromagnetic force for switching operation of the valve body, the valve housing includes a bottomed slide hole in which the spool is slidably fitted, a bottomed housing hole housing the valve section, and extending in parallel with an axis of the slide hole, and a fluid pressure release passage for guiding fluid pressure to a side of the release port, the fluid pressure being released from the valve chamber when the valve section is in the second operating condition, wherein the solenoid section includes a yoke attached to the valve housing and formed from a bottomed cylindrical main yoke and an auxiliary yoke, the main yoke having one end integrated with a ceiling wall and an opposite open end, and the auxiliary yoke closing the open end of the main yoke, a coil assembly formed by winding a coil around a bobbin, and housed in the yoke, a fixed core slidably fitted into a hollow portion of the bobbin, and abutted against the ceiling wall, a movable core disposed in the hollow portion of the bobbin so as to face the fixed core, and passing through the auxiliary yoke, and a coil spring compressedly provided between the fixed core and the movable core, and acting on the cores to be urged away from each other, the fixed core is abutted against the ceiling wall by a predetermined load which the coil spring applies to the fixed core, and by electromagnetic attraction force between the fixed core and the ceiling wall based on energization of the coil, and a valve rod is slidably supported in the housing hole, the valve rod having one end separably abutted against an outer end of the movable core, and an opposite end abutted against the valve body, thereby to operatively connect the valve body with the movable core.

According to the first aspect, the fluid pressure control device, in which the spool valve and the solenoid three-way valve used to switch the operation of the spool valve are provided in the valve housing, is as follows. The fixed core of the solenoid section of the solenoid three-way valve is produced as a part separate from the main yoke so that their production can be more easily achieved with more extensive cost reduction than when molded integrally by forging. Furthermore, the fixed core is slidably fitted into the hollow portion of the bobbin, and is abutted against the ceiling wall by the predetermined load which the coil spring applies to the fixed core, and by the electromagnetic attraction force between the fixed core and the ceiling wall of the main yoke based on the energization of the coil. For this reason, the fixed core is to be held to the ceiling wall of the main yoke without a dedicated fixing member. Thus, it is possible to reduce the number of parts and steps for assembling, in the solenoid three-way valve. Accordingly, a further cost reduction can be achieved. Moreover, the solenoid section of the solenoid three-way valve includes: the yoke attached to the valve housing and formed from the bottomed cylindrical main yoke and the auxiliary yoke closing the open end of the main yoke; the coil assembly in the yoke; the fixed core; the movable core disposed to face the fixed core, and passing through the auxiliary yoke; and the coil spring compressedly provided between the cores. On the other hand, the valve rod is slidably supported in the housing hole of the valve housing and has the one end separably abutted against the outer end of the movable core, and the opposite end abutted against the valve body, thereby to operatively connect the valve body with the movable core. For these reasons, it is possible to commonly use a configuration part of the solenoid section of the solenoid three-way valve with ease for a solenoid section of a different solenoid valve (a solenoid two-way valve, for example) whose valve section has a different structure, and to increase the common use rate. Accordingly, it is possible to achieve a further cost reduction.

According to a second aspect of the present invention, in addition to the first aspect, the housing hole is formed as a stepped hole including a large-diameter hole portion formed on the solenoid section side, and a small-diameter hole portion continuously formed to one end of the large-diameter hole portion via a step portion, first and second valve seat members include first and second valve seats on which the valve body is seated in the first and second operating conditions, respectively, the first and second valve seat members are formed such that one valve seat member is fitted in the small-diameter hole portion while the other valve seat member is press-fitted in the small-diameter hole portion, and the one valve seat member is locked to the small-diameter hole portion by the other valve seat member, and a bearing member is press-fitted into an inner peripheral surface of the large-diameter hole portion, the valve rod slidably passing through and being supported by the bearing member.

According to the second aspect, cooperation between the first and second valve seat members makes it possible to easily form the pair of valve seats in the housing hole, and the valve seat member, which is press-fitted into the small-diameter hole portion, works as the fixing means for the valve seat member which is fitted into the small-diameter hole portion while the latter valve seat member is put inside the small-diameter hole portion. For this reason, a structure can be accordingly simplified. Furthermore, the small-diameter hole portion of the housing hole is continuously formed to one end of the large diameter portion of the solenoid section side of the housing hole. For this reason, the inner peripheral surface of the large-diameter hole portion is not damaged by the press-fitting tools or by the valve seat members when these valve seat members and press-fitting tools are easily inserted through the large-diameter hole at the assembling process. Accordingly, the bearing member can be easily and accurately press-fitted into the large-diameter hole portion.

According to a third aspect of the present invention, in addition to the first or second aspect, an end surface of the valve rod, which faces the movable core, is formed in a spherical surface shape such that at least a central portion of the end surface bulges out toward the movable core.

According to the third aspect, the end surface of the valve rod which faces the movable core is formed in a spherical surface shape in the way that at least the central portion of the end surface bulges out toward the movable core. For this reason, even if the valve rod tilts or becomes misaligned in relation to the movable core as a result of forming the valve rod as a part separate from the movable core, surface contact of the valve rod with the movable core is satisfactory. Accordingly, it is possible to prevent an increase in lateral pressure on the movable core and an increase in consumption value of electromagnetic attraction force of the solenoid section. Thereby, it is possible to make not only the movable core but also the valve body operated smoothly without increasing capacity of the coil.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be hereinbelow described on the basis of one embodiment of the present invention illustrated in the accompanying drawings.

Figure 1:
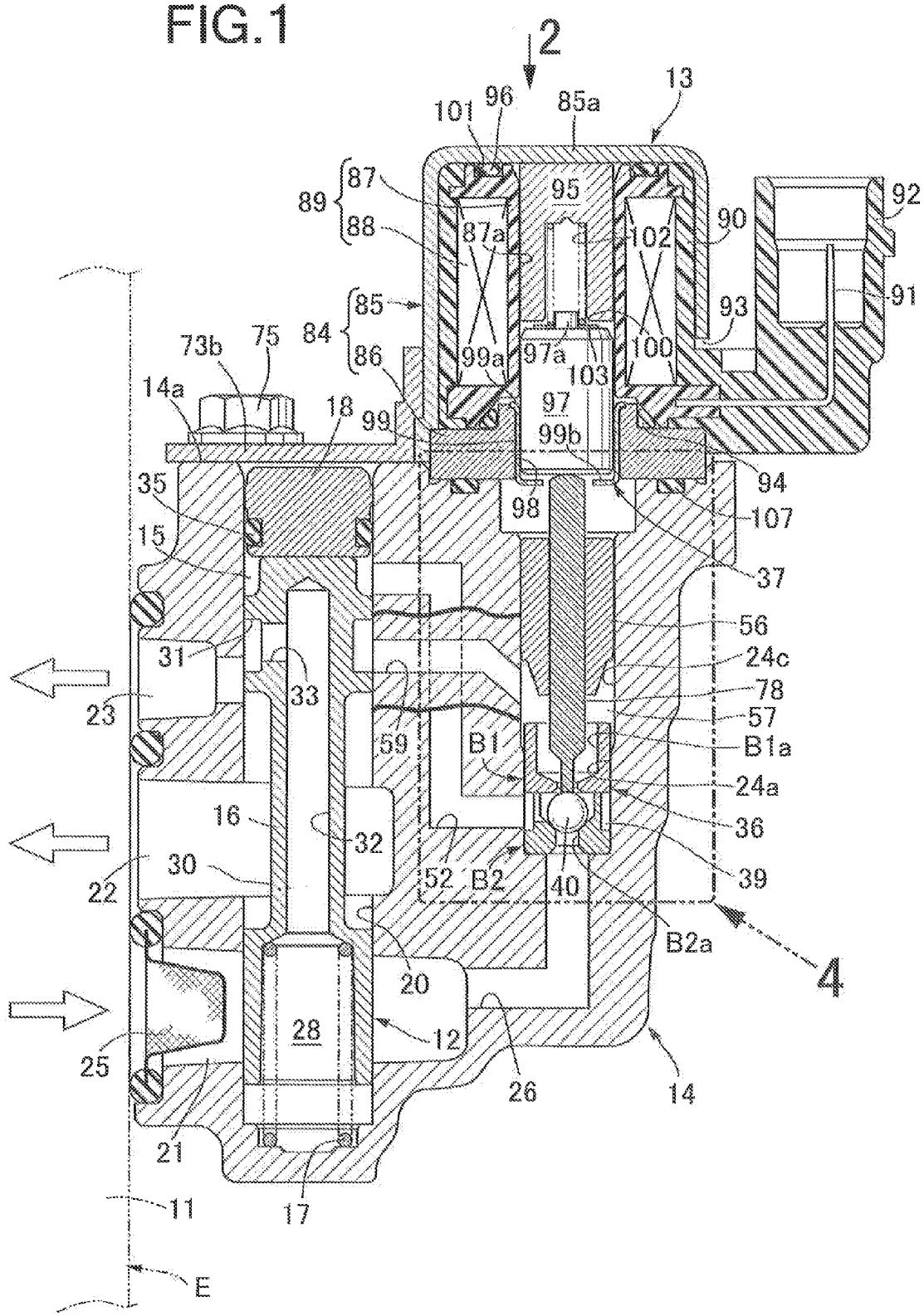
FIG. 1 is a longitudinal sectional view of a fluid pressure control device whose solenoid three-way valve is in a second operating condition (a condition for releasing fluid pressure from a pilot chamber) (a sectional view taken along a 1-1 line in FIG. 2).
Figure 2:
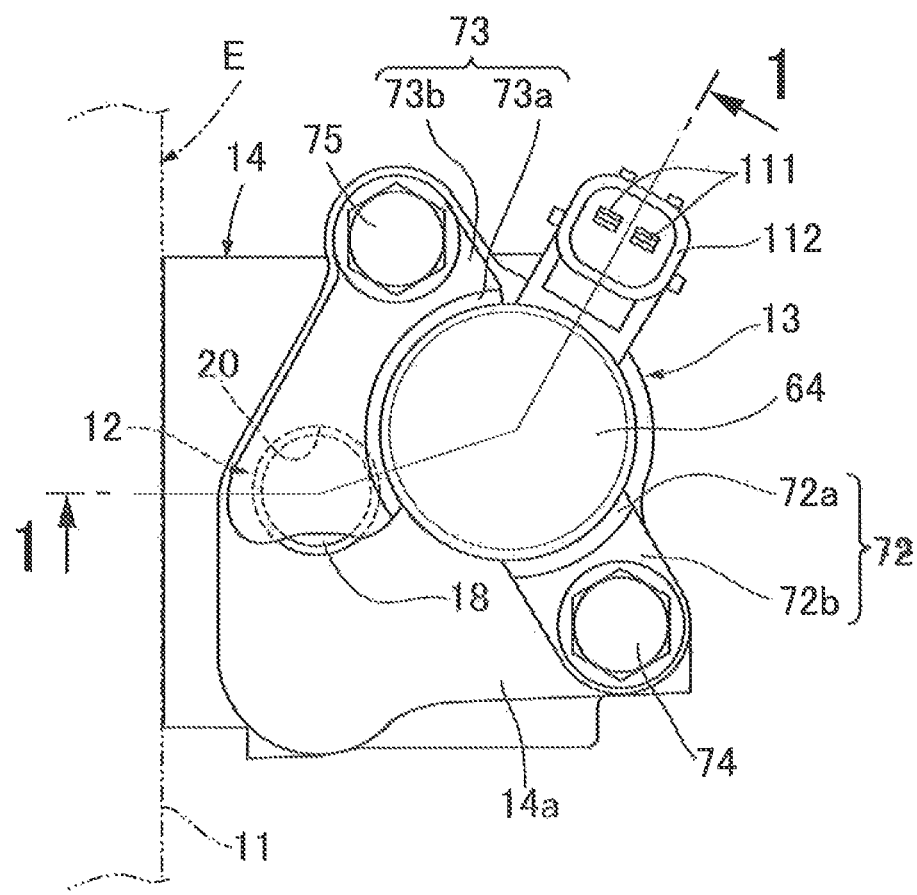
FIG. 2 is a plan view from an arrow 2 in FIG. 1.

First of all, in FIGS. 1 and 2, this fluid pressure control device is, for example, that which applies fluid pressure to a valve system in an engine E installed in a vehicle while switching the fluid pressure between high and low pressures for the purpose of changing operating characteristics of the valve system. The fluid pressure control device includes: a spool valve 12 including a valve housing 14 fastened to an engine body 11 of the engine E; and a solenoid three-way valve 13 attached to the valve housing 14 so as to be interposed between a pilot chamber 15 included in the spool valve 12 and a fluid pressure source, such as a fluid pressure pump included in the engine body 11, and the like. The solenoid three-way valve 13 is detachably attached to the valve housing 14 by fastening a pair of attachment stays 72, 73, which are fixed to a yoke 84, to the valve housing 14 with bolts 74, 75, respectively, as described later.

The spool valve 12 includes: the valve housing 14; a spool 16 slidably fitted in the valve housing 14 with one end of the spool 16 facing the pilot chamber 15; a return spring 17 provided between the valve housing 14 and the spool 16, and exerting spring force for biasing the spool 16 in a direction of decreasing the volume of the pilot chamber 15; and a seal plug 18 liquid-tightly press-fitted in the valve housing 14 in a way that the pilot chamber 15 is formed between the seal plug 18 and the one end of the spool 16.

As an upper one of outer side surfaces of the valve housing 14 fastened to the engine body 11, one surface 14a is formed in a flat shape. The valve housing 14 is provided with: a bottomed slide hole 20 extending up and down with one end of the slide hole 20 opened in the one surface 14a; an input port 21, an output port 22 and a release port 23 which are opened at the respective positions arranged at intervals in an axial direction of an inner side surface of the slide hole 20; and a bottomed housing hole 24 extending up and down in parallel with the slide hole 20, and opened on the same side in the direction in which the slide hole 20 is opened. The housing hole 24 is used as an attachment hole for the solenoid three-way valve 13, as described later.

A cross section of the input port 21 is formed in a rectangular shape, and the rectangular shape has a width greater than a diameter of the slide hole 20. The input port 21 is provided to the valve housing 14 so as to traverse a lower portion of the slide hole 20 on a plane orthogonal to an axis of the slide hole 20. An outer end of the input port 21 is opened in a side surface of the valve housing 14 on a side of the engine body 11 so as to be connected to the fluid pressure source inside the engine body 11. A filter 25 is installed in an open end portion of the input port 21. In addition, a communication hole 26 provided to the valve housing 14 communicates the inner end portion of the input port 21 with a bottom end portion of the housing hole 24.

Thereby, an intermediate portion of the input port 21 is opened in an inner side surface of the lower portion of the slide hole 20, but is not blocked by the spool 16 in the slide hole 20. Regardless of where the spool 16 is situated inside the slide hole 20, the bottom end portion of the housing hole 24 (namely, a valve hole B2a formed in a second valve seat member B2 which will be described later) is always communicated with the fluid pressure source inside the engine body 11 via the communication hole 26 and the input port 21.

The output port 22 is disposed at a position spaced out above the input port 21 along the axis of the slide hole 20. The output port 22 is provided to the valve housing 14 so as to traverse an intermediate portion of the slide hole 20 on a plane orthogonal to the axis of the slide hole 20. An outer end of the output port 22 is opened in the side surface of the valve housing 14 on the side of the engine body 11 so as to be connected to the valve operating system of the engine E.

The release port 23 is disposed at a position spaced out above the output port 22 along the axis of the slide hole 20. The release port 23 is provided to the valve housing 14 in a way that an inner end portion of the release port 23 is opened in an inner side surface of an upper portion of the slide hole 20 on a plane orthogonal to the axis of the slide hole 20. An outer end of the release port 23 is opened in the side surface of the valve housing 14 on the side of the engine body 11 in order to return a working fluid (oil, for example) to the engine body 11 side.

The spool 16 is slidably fitted in the slide hole 20 with the one end of the spool 16 facing the pilot chamber 15. A spring chamber 28 is formed between the opposite end of the spool 16 and a closed portion of an opposite end of the slide hole 20. The return spring 17 is housed in the spring chamber 28 so as to be provided between the opposite end portion of the spool 16 and the closed end portion of the slide hole 20.

An outer peripheral surface of the spool 16 is provided with: a first annular recessed portion 30 for communicating the output port 22 with the input port 21 or the release port 23 by alternatively switching between the input port 21 and the release port 23; and a second annular recessed portion 31 always leading to the release port 23. In addition, the spool 16 is coaxially provided with a release passage 32 leading to the spring chamber 28, and with a communication hole 33 for communicating the release passage 32 with the second annular recessed portion 31. The spring chamber 28 communicates with the release port 23 via the release passage 32, the communication hole 33 and the second annular recessed portion 31.

When the fluid pressure of the pilot chamber 15 is low, the spring force of the return spring 17 makes the spool 16 situated at an upper limit position at which the spool 16 reduces the volume of the pilot chamber 15, as shown in FIG. 1. While in this state, the spool 16 disconnects the output port 22 and the input port 21, as well as communicates the output port 22 with the release port 23 via the first annular recessed portion 30.

As the fluid pressure of the pilot chamber 15 becomes higher, the fluid pressure moves the spool 16 downward against the spring force of the return spring 17 to a lower limit position at which the spool 16 increases the volume of the pilot chamber 15. While in this state, the spool 16 disconnects the output port 22 and the release port 23, as well as communicates the output port 22 with the input port 21 via the first annular recessed portion 30. Output fluid pressure from the output port 22, which leads to the input port 21, becomes higher.

Once the fluid pressure is released from the pilot chamber 15, the spring force of the return spring 17 returns the spool 16 to the upper limit position illustrated in FIG. 1.

Figure 3:
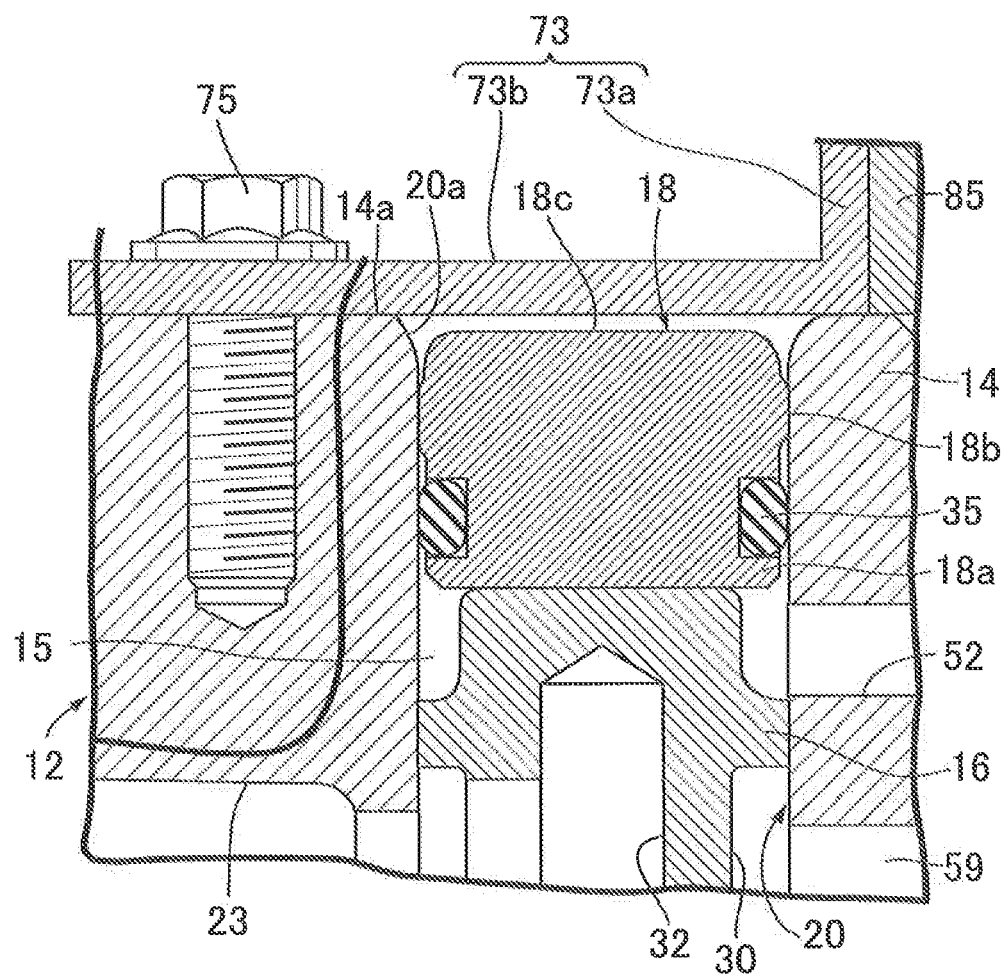
FIG. 3 is an enlarged view of a main part in FIG. 1.

In FIG. 3, the seal plug 18 includes: a sealing portion 18a with an O-ring 35 as an annular sealing member attached to an outer periphery of the sealing portion 18a, the O-ring 35 being in elastic contact with an inner peripheral surface of the slide hole 20; a press-fitted portion 18b formed with a diameter larger than that of the sealing portion 18a so as to be press-fitted in the slide hole 20, as well as coaxially and integrally connected to the sealing portion 18a; and a small-diameter portion 18c formed with a diameter smaller than that of the press-fitted portion 18b, as well as coaxially and integrally connected to an opposite portion of the press-fitted portion 18b from the sealing portion 18a. The seal plug 18 is press-fitted into one end portion of the slide hole 20 with the sealing portion 18a placed inward in the axial direction.

On the other hand, the one end of the slide hole 20 is provided with a curved enlarged diameter portion 20a in a way that the diameter of the enlarged diameter portion 20a becomes larger toward the outside in the axial direction. The seal plug 18 is press-fitted into the one end portion of the slide hole 20 until an outer end of the press-fitted portion 18b becomes situated inward of an inner end of the enlarged diameter portion 20a. An outer end of the small-diameter portion 18c is placed slightly inward of the one surface 14a of the valve housing 14.

Figure 4:
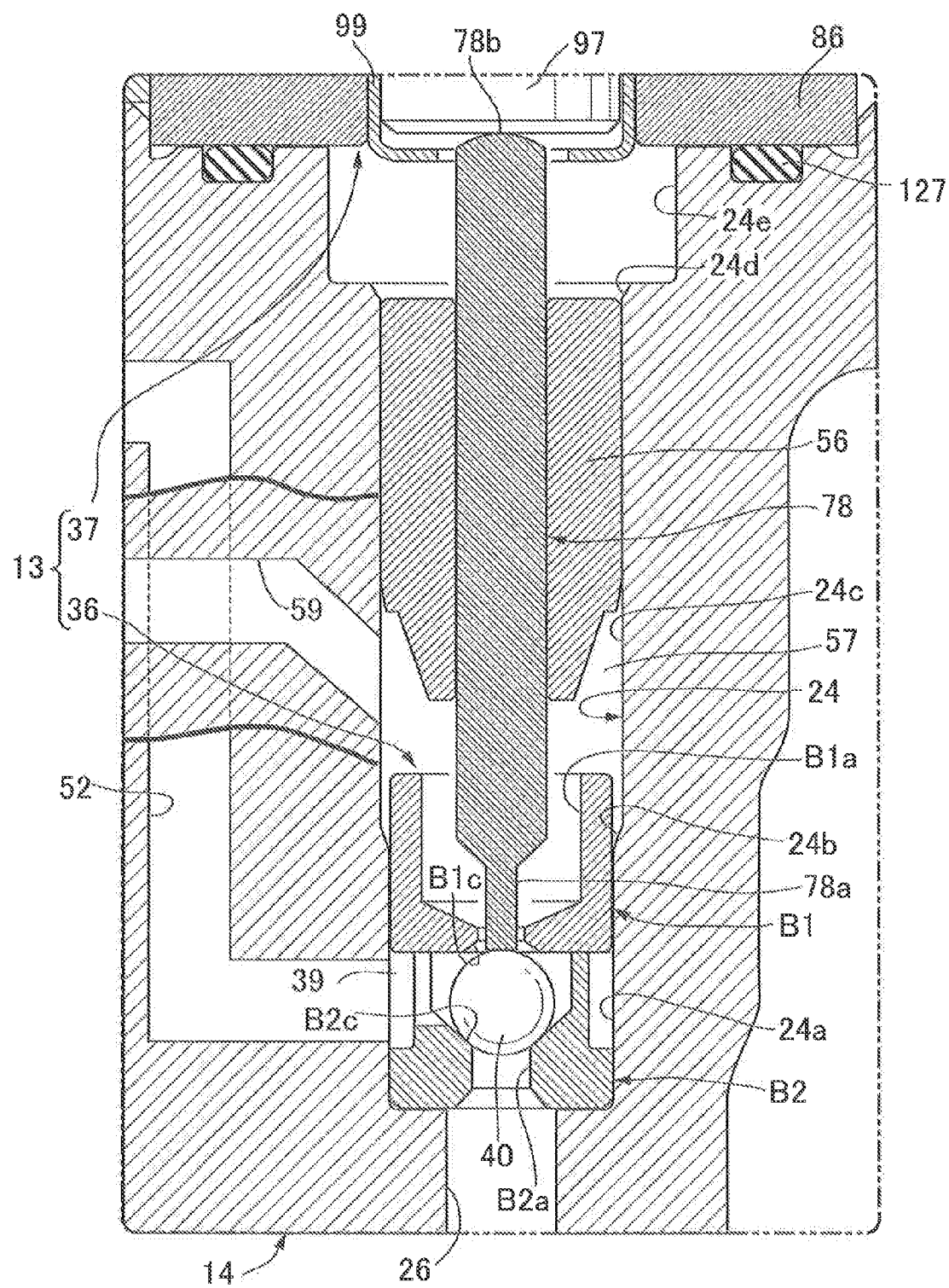
FIG. 4 is an enlarged longitudinal sectional view of a valve section in the solenoid three-way valve (an enlarged sectional view of a portion indicated by an arrow 4 in FIG. 1).

Referring to FIG. 4 together, a peripheral wall part of the housing hole 24 of the valve housing 14 functions as a housing portion for the solenoid three-way valve 13. The housing hole 24 is formed as a stepped hole including: a small-diameter hole portion 24a on a bottom end side of the housing hole 24; a large-diameter hole portion 24c coaxially continuing to the small-diameter hole portion 24a via a first step portion 24b having a taper shape; and an inlet hole portion 24e with a diameter larger than that of the large-diameter hole portion 24c, the inlet hole portion 24e coaxially continuing to the large-diameter hole portion 24c via a second step portion 24d having a taper shape. Furthermore, an outer open end of the inlet hole portion 24e is opened in an upper surface of the valve housing 14.

In addition, the solenoid three-way valve 13 is formed from: a valve section 36 which has a valve body 40 and a valve chamber 39, the valve body 40 being operated to alternatively switch between a first operating condition and a second operating condition; and a solenoid section 37 which exerts electromagnetic force for switching an operation of the valve body 40. In the first operating condition, the valve chamber 39, which is defined in the housing hole 24 (the small-diameter hole portion 24a in particular) so as to lead to the pilot chamber 15 of the spool valve 12, is communicated with the input port 21 so that the fluid pressure is applied to the pilot chamber 15. In the second operating condition, the valve chamber 39 is communicated with the release port 23 so that the fluid pressure is released from the pilot chamber 15.

The valve section 36 includes a first valve seat member B1 and a second valve seat member B2, these having a first valve seat B1c and a second valve seat B2c on which to seat the ball-shaped valve body 40 in the first and second operating conditions, respectively. Of the valve seat members, one valve seat member (the second valve seat member B2 in the illustrated example) is fitted in the small-diameter hole portion 24a, while the other valve seat member (the first valve seat member B1 in the illustrated example) is press-fitted in the small-diameter hole portion 24a so as to be adjacent to an end portion of the one valve seat member which is closer to the solenoid section 37.

Moreover, both of the first valve seat member B1 and the second valve seat member B2 are formed in a cylindrical shape, these having valve holes B1a and B2a in a way that central portions of the first and second valve seat members B1 and B2 are vertically penetrated through by valve holes B1a and B2a, respectively. The first valve seat B1c is provided to an opening edge of a lower portion of the valve hole B1a of the first valve seat member B1, while the second valve seat B2c is provided to an opening edge of an upper portion of the valve hole B2a of the second valve seat member B2. In addition, the annular valve chamber 39 surrounding the valve body 40 is formed between mutually-opposed surfaces of the respective first and second valve seat members B1, B2. A communication passage 52 is formed in the valve housing 14. One end of the communication passage 52 communicates with the pilot chamber 15 of the spool valve 12, and an opposite end of the communication passage 52 communicates with the valve chamber 39.

In addition, the valve hole B2a of the second valve seat member B2 communicates with the input port 21 via the communication hole 26 which is formed in the valve housing 14 and opened in the bottom end of the housing hole 24 (the small-diameter hole portion 24a). On the other hand, the valve hole Bla of the first valve seat member B1 communicates with a release chamber 57 which is defined between a bearing member 56 and the first valve seat member B1 inside the housing hole 24. A fluid pressure release passage 59 is formed in the valve housing 14. One end of the fluid pressure release passage 59 communicates with the release port 23 of the spool valve 12. The release chamber 57 communicates with an opposite end of the fluid pressure release passage 59.

Furthermore, the cylindrical bearing member 56 is press-fitted in and fixed to the large-diameter hole portion 24c of the housing hole 24 so as to be spaced out above the first valve seat member B1. As described later, the bearing member 56 slidably supports a valve rod 78 which has one end separably abutted against a tip end (lower end) of a movable core 97 of the solenoid section 37, and an opposite end separably abutted against the valve body 40, thereby to operatively connect the valve body 40 with the movable core 97. Furthermore, the valve rod 78 is coaxially and integrally provided with a small-diameter shaft portion 78a which loosely passes through a tapering lower end portion of the valve hole B1a in the first valve seat member B1. A tip end of the small-diameter shaft portion 78a is abutted against the valve body 40 in the valve chamber 39. In addition, an upper end surface of the valve rod 78, namely an end surface 78b of the valve rod 78 which faces the movable core 97, is formed in a spherical surface shape in a way that at least a central portion (in the illustrated example, a whole surface) of the end surface 78b bulges out upward, namely toward the movable core 97.

Meanwhile, the valve body 40 is housed in the valve chamber 39 so as to be able to alternatively switch between the first operating condition in which the valve body 40 is seated on the first valve seat B1c formed on the first valve seat member B1 (namely, the condition in which the valve hole B1a is closed so as to open the valve hole B2a) and the second operating condition in which, as illustrated in FIG. 4, the valve body 40 is seated on the second valve seat B2c formed on the second valve seat member B2 (namely, the condition in which the valve hole B2a is closed so as to open the valve hole B1a). For this reason, while in the first operating condition in which the valve body 40 is seated on the first valve seat B1c, the valve chamber 39 leads to the input port 21 via the valve hole B2a and the communication hole 26. While in this condition, the fluid pressure of the input port 21 is applied to the pilot chamber 15 in the spool valve 12. On the other hand, while in the second operating condition in which the valve body 40 is seated on the second valve seat B2c, the valve chamber 39 leads to the fluid pressure release passage 59 via the valve hole B1a and the release chamber 57. While in this condition, the fluid pressure of the pilot chamber 15 in the spool valve 12 is released. Incidentally, in the illustrated example, as described later, the first operating condition is obtained when the solenoid section 37 is energized and thereby exerts electromagnetic attraction force, and the second operating condition is obtained when the energization of the solenoid section 37 is terminated.

In addition, the solenoid section 37 includes the yoke 84, and a coil assembly 89 housed in the yoke 84. The yoke 84 includes: a bottomed cylindrical main yoke 85 integrally having one end integrated with a ceiling wall 85a and an opposite open end; and an auxiliary yoke 86 press-fitted to an inner peripheral surface of an open end portion of the main yoke 85. Incidentally, the main yoke 85 is produced by press-forming a steel plate.

The coil assembly 89 is formed by winding a coil 88 around a bobbin 87. A covering layer 90 made of synthetic resin is formed around an outer periphery of the coil assembly 89 by injection molding. While the covering layer 90 is being formed, a coupler 92 is formed integrally with the covering layer 90 so as to project from one side of the coil assembly 89. The coupler 92 holds a power supplying terminal 91 wired to the coil 88. The main yoke 85 is provided with a cutout portion 93 through which a neck portion of the coupler 92 passes. As a first seal member, an O-ring 94 for sealing a gap between the auxiliary yoke 86 and the bobbin 87 is installed between the auxiliary yoke 86 and the bobbin 87.

A fixed core 95 abutted against the ceiling wall 85a is slidably fitted into a hollow portion 87a of the bobbin 87. In addition, an annular seal groove 101 surrounding the fixed core 95 is formed in an opposed surface of the bobbin 87 which is opposite to the ceiling wall 85a. As a second seal member, an annular O-ring 96 in intimate contact with the ceiling wall 85a is attached into the seal groove 101 for sealing a gap between the ceiling wall 85a and the bobbin 87.

Furthermore, the movable core 97 facing the fixed core 95 is disposed in the hollow portion 87a of the bobbin 87 so as to slidably pass through a through-hole 98 in the auxiliary yoke 86. A set collar 99 formed by non-magnetic material for holding the movable core 97 is attached into the through-hole 98. The set collar 99 has, at its inner end, an attachment flange 99a disposed between the bobbin 87 and the auxiliary yoke 86, and also has, at its outer end, an inward-directed flange 99b for preventing the movable core 97 from coming off the through-hole 98. Before the solenoid section 37 of the solenoid three-way valve 13 is attached to the valve housing 14 (namely, while the movable core 97 is in the state of being separated from the valve rod 78), the set collar 99 prevents the movable core 97 from coming off the through-hole 98. After the solenoid section 37 is attached to the valve housing 14, the set collar 99 does not interfere with reciprocating operation of the movable core 97.

A coil spring 100 for acting on the fixed core 95 and the movable core 97 to be urged away from each other is compressedly provided between the fixed core 95 and the movable core 97. A large part of the coil spring 100 is housed in a spring holding hole 102 which is opened in an attraction surface of the fixed core 95. A movable end of the coil spring 100 is positioned by a short shaft 97a which projects from an attraction surface of the movable core 97. In addition, a non-magnetic washer 103 held by the coil spring 100 is disposed on the attraction surface of the movable core 97. Moreover, as a third seal member, an O-ring 107 sealing a gap between the auxiliary yoke 86 and the valve housing 14, and surrounding the set collar 99 is installed between the auxiliary yoke 86 and the valve housing 14.

The yoke 84 functioning as a solenoid housing is attached to the valve housing 14 with the pair of attachment stays 72, 73. Both the attachment stays 72, 73 integrally include: supporting plate portions 72a, 73a fixed to an outer surface of the main yoke 85 by fixing means such as welding, screwing or the like; and fastened plate portions 72b, 73b fastened to the one surface 14a of the valve housing 14 with the bolts 74, 75, respectively. A longitudinal section of each of the attachment stays 72, 73 is formed in a L-shape. The fastened plate portion 73b of the attachment stay 73, which is one of the attachment stays 72, 73, is formed so as to cover at least a part (a part, in this embodiment) of the seal plug 18 which is press-fitted in the slide hole 20 in the valve housing 14. A slight gap exists between the outer end of the small-diameter portion 18c of the seal plug 18 and the fastened plate portion 73b fastened to the one surface 14a.

In this solenoid section 37, when the coil 88 is in a non-energized state, the movable core 97 is separated from the fixed core 95 by the spring force of the coil spring 100 so that the valve body 40 in the valve section 36 is seated on the second valve seat B2c with the assistance of the valve rod 78 (namely, the valve body 40 is held in the second operating condition). Thereby, the pilot chamber 15 leads to the release port 23 via the communication passage 52, the valve chamber 39, the valve hole B1a, the release chamber 57 and the fluid pressure release passage 59. On the other hand, when the coil 88 is in an energized state, the movable core 97 is moved and attracted to the fixed core 95 side against the spring force of the coil spring 100, and the movement allows the valve rod 78 to slide upward. For this reason, the valve body 40 is pushed upward by the fluid pressure from the input port 21, and gets seated on the first valve seat B1c (namely, is switched to the first operating condition). As a result, the pilot chamber 15 leads to the input port 21 via the communication passage 52, the valve chamber 39, the valve hole B2a and the communication hole 26.

Next, descriptions will be provided for an operation of the embodiment. The valve housing 14 of the spool valve 12 is provided with: the bottomed slide hole 20 with the one end of the slide hole 20 opened in the one surface 14a of the valve housing 14, and with the spool 16 slidably fitted in the slide hole 20; and the bottomed housing hole 24 housing the valve section 36 of the solenoid three-way valve 13, and extending in parallel with the axis of the slide hole 20. The spool valve 12 and the solenoid three-way valve 13 can be disposed in the valve housing 14 in a way that the axes of the spool valve 12 and the solenoid three-way valve 13 are in parallel with each other. For this reason, the size of the valve housing 14, namely the fluid pressure control device, can be reduced in a direction along the axes of the spool valve 12 and the solenoid three-way valve 13.

The valve housing 14 is further provided with the fluid pressure release passage 59 for guiding the fluid pressure released from the valve chamber 39 of the valve section 36 in the solenoid three-way valve 13, in the way that the fluid pressure release passage 59 leads to the release port 23 via the second annular recessed portion 31 of the spool valve 12. For this reason, any extra release port is not required for the solenoid three-way valve 13 side. Even in a case where working fluid is not intended to be released or drained to the outside of the fluid pressure control device, a single release port as the release port 23 is sufficient, and cost can be saved.

Meanwhile, in the solenoid section 37 of the solenoid three-way valve 13, the coil spring 100 acts on the fixed core 95 and the movable core 97 to be urged away from each other by a predetermined load of the coil spring 100. For this reason, when the coil 88 is not energized, the predetermined load of the coil spring 100 presses the fixed core 95 such that the fixed core 95 is abutted against the ceiling wall 85a of the main yoke 85, and presses the movable core 97 in the way that the movable core 97 seats the valve body 40 on the valve seat B2c of the second valve seat member B2. Thereby, the valve body 40 is held in the second operating condition (see FIG. 4).

Once the coil 88 is energized while in this condition, the coil 88 produces a magnetic flux, and the magnetic flux sequentially flows to the fixed core 95, the main yoke 85, the auxiliary yoke 86, the movable core 97 and the fixed core 95. Thereby, electromagnetic attraction force occurs between the fixed core 95 and the ceiling wall 85a of the main yoke 85, and the fixed core 95 is attracted to the ceiling wall 85a. Simultaneously, electromagnetic attraction force occurs between the fixed core 95 and the movable core 97, as well as the fixed core 95 and the movable core 97 are placed in mutually attracted state with the non-magnetic washer 103 being placed between the fixed core 95 and the movable core 97. Since the fixed core 95 is attracted to the ceiling wall 85a, both of the mutually-attracted cores 95 and 97 are simultaneously attracted as an integrated unit to the ceiling wall 85a. Accordingly, the valve body 40 is pushed upward by the fluid pressure from the input port 21, and gets seated on the first valve seat B1c. In other words, the valve body 40 is switched to the first operating condition.

To this end, the predetermined load applied to the fixed core 95 by the coil spring 100, and the electromagnetic attraction force between the fixed core 95 and the ceiling wall 85a based on the energization of the coil 88, are adapted such that the fixed core 95 inside the hollow portion 87a of the bobbin is abutted against the ceiling wall 85a. For this reason, the fixed core 95 is to be held to the ceiling wall 85a of the main yoke 85 without a dedicated fixing member. Accordingly, it is possible to reduce the number of parts and steps for assembling, in the solenoid three-way valve 13.

In addition, it is desirable that the predetermined load of the coil spring 100 is at such a level that while the coil 88 is not energized, the predetermined load can prevent the fixed core 95 from going afloat from the ceiling wall 85a, even if predetermined vibration acceleration (vibration acceleration with an upper limit value of 30 G, for example) is applied to the solenoid three-way valve 13 from the vehicle. By the setting like this, when the coil 88 is not energized, even if vibration is applied to the solenoid three-way valve 13 due to traveling of the vehicle, it is possible to prevent the fixed core 95 from going afloat from the ceiling wall 85a so that the fixed core 95 can be always abutted against the ceiling wall 85a. For these reasons, once the coil 88 is energized, the fixed core 95 is attracted to the ceiling wall 85a, and simultaneously attracts the movable core 97. Thereby, the valve body 40 can be switched to the first operating condition.

Meanwhile, the working fluid in the housing hole 24 enters the hollow portion 87a of the bobbin 87 along a periphery of the movable core 97. Since, however, the second seal member 96 surrounding the fixed core 95 is installed between the ceiling wall 85a of the yoke 84 and the bobbin 87, the flow-out of the working fluid to the outside of the yoke 84 can be prevented by the second seal member 96. Incidentally, installation of a seal member between the fixed core 95 and the bobbin 87 might be a possible idea for preventing the working fluid from flowing out to the outside of the yoke 84, but sliding frictional resistance of the fixed core 95 increases due to fastening force of the seal member to the fixed core 95. For this reason, if the electromagnetic attraction force between the ceiling wall 85a and the fixed core 95 would not be increased, the valve body 40 would be unable to be switched to the first operating condition, and capacity of the coil 88 accordingly would have to be increased. With this taken into consideration, the embodiment installs the second seal member 96, which surrounds the fixed core 95, between the ceiling wall 85a and the bobbin 87, as described above. Thus, the second seal member 96 does not increase the sliding frictional resistance of the fixed core 95. Accordingly, the embodiment makes it unnecessary to increase the capacity of the coil 88, and contributes to reduction in the size of the solenoid three-way valve 13.

Moreover, once the energization of the coil 88 is terminated, the predetermined load of the coil spring 100 acts on the cores 95 and 97 to be urged away from each other such that the fixed core 95 is abutted against the ceiling wall 85a, and concurrently moves the movable core 97 away from the fixed core 95, thus returning the valve body 40 to the second operating condition with the assistance of the valve rod 78. In this event, the non-magnetic washer 103 provided to an opposed surface of the movable core 97 which is opposite to the fixed core 95 can undo the attraction between the cores 95, 97 based on residual magnetism, and enhance return responsiveness of the movable core 97. Furthermore, the structure for holding the washer 103 is simple, since the washer 103 is held to the movable core 97 by using the coil spring 100.

In addition, the solenoid three-way valve 13 of the embodiment is as follows. Since the fixed core 95 of the solenoid section 37 is produced as a part separate from the yoke 84, namely the solenoid housing, their production can be more easily achieved with more extensive cost reduction than when molded integrally by forging. Furthermore, since the fixed core 95 is slidably fitted into the hollow portion 87a of the bobbin, and is abutted against the ceiling wall 85a by the predetermined load which the coil spring 100 applies to the fixed core 95, and by the electromagnetic attraction force between the fixed core 95 and the ceiling wall 85a of the main yoke based on the energization of the coil 88, the fixed core 95 is to be held to the ceiling wall 85a without a dedicated fixing member. For this reason, it is possible to reduce the number of parts and steps for assembling, in the solenoid three-way valve 13. Accordingly, a further cost reduction can be achieved.

Besides, the solenoid section 37 of the solenoid three-way valve 13 includes: the coil assembly 89 housed in the yoke 84 which is formed from the bottomed cylindrical main yoke 85 and the auxiliary yoke 86 closing the open end of the main yoke 85, and which is detachably attached to the valve housing 14; the fixed core 95; the movable core 97 disposed in the hollow portion 87a of the bobbin so as to be opposite to the fixed core 95, and passing through the auxiliary yoke 86; and the coil spring 100 compressedly provided between the cores. In addition, the housing hole 24 in the valve housing 14 slidably supports the valve rod 78 which has the one end separably abutted against an outer end of the movable core 97, and the opposite end abutted against the valve body 40 thereby to operatively connect the valve body 40 with the movable core 97. For these reasons, it is possible to commonly use all or almost all of the configuration part of the solenoid section 37 of the solenoid three-way valve 13 with ease for a solenoid section of a different solenoid valve (a solenoid two-way valve, for example) whose valve section has a different structure, and to increase the common use rate. Accordingly, it is possible to achieve a further cost reduction.

In addition, the end surface 78b of the valve rod 78 which faces the movable core 97 is formed in a spherical surface shape in the way that at least the central portion (in the illustrated example, the whole surface) of the end surface 78b bulges out upward, namely toward the movable core 97. For this reason, even if the valve rod 78 tilts or becomes misaligned in relation to the movable core 97 as a result of forming the valve rod 78 as a part separate from the movable core 97, the surface contact of the valve rod 78 with the movable core 97 is satisfactory. Accordingly, it is possible to prevent an increase in lateral pressure on the movable core 97 and an increase in sliding friction of the valve rod 78, and thus to effectively preclude an increase in driving load of the solenoid section 37. Thereby, it is possible to make not only the movable core 97 but also the valve body 40 is operated smoothly without increasing the capacity of the coil 88.

Moreover, in the embodiment, the first and second valve seat members B4 and B2 are directly fitted in the housing hole 24 of the valve housing 14. For this reason, it is possible to easily form the valve chamber 39 within the pair of valve seats B1c and B2c in the housing hole 24. Furthermore, once the first valve seat member B1 is press-fitted into the small-diameter hole portion 24a of the housing hole 24, the first valve seat member B1 acts as fixing means for preventing coming off of the second valve seat member B2 from the small-diameter hole portion 24a. For this reason, the structure can be accordingly simplified. In addition, the part of the housing hole 24 from which the first valve seat member B1 is press-fitted into the housing hole 24 (the small-diameter hole portion 24a) is the large-diameter hole portion 24c. For this reason, it is possible to effectively avoid damage to an inner peripheral surface of the large-diameter hole portion 24c due to the valve seat members B1, B2, press-fitting tools, and the like. Accordingly, the bearing member 56 can be easily and accurately press-fitted into the large-diameter hole portion 24c.

Although the foregoing descriptions have been provided for the embodiment of the present invention, the present invention is not limited to the above-described embodiment. Various design changes may be made to the present invention without departing from the gist of the present invention.

For example, although in the above-described embodiment, the spool valve 12 is designed to alternatively switch the communication and disconnection of the output port 22 with and from the input port 21 or the release port 23, the spool valve may be designed to alternatively switch the communication and disconnection of a pair of output ports with and from the input port or the release port in a way that when one output port leads to the input port, the other output port is made to lead to the release port.

Furthermore, although the above-described embodiment shows the valve rod 78 whose one end portion is separably abutted against the valve body 40, the present invention may be such that the opposite end of the valve rod is integrally abutted against, namely, is connected to the valve body.

What is claimed is:

1. A fluid pressure control device comprising:
a valve housing;
a spool valve; and
a solenoid three-way valve used to switch an operation of the spool valve, the spool valve and the solenoid three-way valve being provided in the valve housing,
in which the spool valve includes a spool, the spool having one end facing a pilot chamber, and the spool is biased by a spring in a direction of decreasing a volume of the pilot chamber,
the spool is slidably fitted in the valve housing so as to be able to alternatively communicate an output port with one of an input port and a release port,
the solenoid three-way valve includes
a valve section having a valve body and a valve chamber, the valve body being operated to alternatively switch between a first operating condition and a second operating condition, wherein in the first operating condition the valve chamber leading to the pilot chamber is communicated with the input port, and in the second operating condition the valve chamber is communicated with the release port, and
a solenoid section which exerts electromagnetic force for switching operation of the valve body,
the valve housing includes
a bottomed slide hole in which the spool is slidably fitted,
a bottomed housing hole housing the valve section, and extending in parallel with an axis of the slide hole, and
a fluid pressure release passage for guiding fluid pressure to a side of the release port, the fluid pressure being released from the valve chamber when the valve section is in the second operating condition,
wherein the solenoid section includes
a yoke attached to the valve housing and formed from a bottomed cylindrical main yoke and an auxiliary yoke, the main yoke having one end integrated with a ceiling wall and an opposite open end, and the auxiliary yoke closing the open end of the main yoke,
a coil assembly formed by winding a coil around a bobbin, and housed in the yoke,
a fixed core slidably fitted into a hollow portion of the bobbin, and abutted against the ceiling wall,
a movable core disposed in the hollow portion of the bobbin so as to face the fixed core, and passing through the auxiliary yoke, and
a coil spring compressedly provided between the fixed core and the movable core, and acting on the cores to be urged away from each other,
the fixed core is abutted against the ceiling wall by a predetermined load which the coil spring applies to the fixed core, and by electromagnetic attraction force between the fixed core and the ceiling wall based on energization of the coil, and
a valve rod is slidably supported in the housing hole, the valve rod having one end separably abutted against an outer end of the movable core, and an opposite end abutted against the valve body, thereby to operatively connect the valve body with the movable core.

2. The fluid pressure control device according to claim 1, wherein
the housing hole is formed as a stepped hole including
a large-diameter hole portion formed on the solenoid section side, and
a small-diameter hole portion continuously formed to one end of the large-diameter hole portion via a step portion,
first and second valve seat members include first and second valve seats on which the valve body is seated in the first and second operating conditions, respectively,
the first and second valve seat members are formed such that one valve seat member is fitted in the small-diameter hole portion while the other valve seat member is press-fitted in the small-diameter hole portion, and the one valve seat member is locked to the small-diameter hole portion by the other valve seat member, and
a bearing member is press-fitted into an inner peripheral surface of the large-diameter hole portion, the valve rod slidably passing through and being supported by the bearing member.

3. The fluid pressure control device according to claim 2, wherein an end surface of the valve rod, which faces the movable core, is formed in a spherical surface shape such that at least a central portion of the end surface bulges out toward the movable core.

4. The fluid pressure control device according to claim 1, wherein an end surface of the valve rod, which faces the movable core, is formed in a spherical surface shape such that at least a central portion of the end surface bulges out toward the movable core.

* * * * *